(12) United States Patent
Fetterly et al.

(10) Patent No.: US 9,600,365 B2
(45) Date of Patent: Mar. 21, 2017

(54) LOCAL ERASURE CODES FOR DATA STORAGE

(71) Applicant: Microsoft Corporation, Redmond, WA (US)

(72) Inventors: Dennis Craig Fetterly, Belmont, CA (US); Parikshit S Gopalan, Mountain View, CA (US); Cheng Huang, Redmond, WA (US); Robert John Jenkins, Jr., Redmond, WA (US); Jin Li, Sammamish, WA (US); Sergey Yekhanin, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

(21) Appl. No.: 13/863,912

(22) Filed: Apr. 16, 2013

(65) Prior Publication Data
US 2014/0310571 A1  Oct. 16, 2014

(51) Int. Cl.
*G06F 11/00* (2006.01)
*G06F 11/10* (2006.01)

(52) U.S. Cl.
CPC ...... *G06F 11/1076* (2013.01); *G06F 11/1088* (2013.01); *G06F 2211/1057* (2013.01)

(58) Field of Classification Search
CPC .. G11C 19/00; G06F 11/1048; G06F 11/1076; G06F 11/1088; G06F 2211/1057
USPC .......................... 714/801, 799–800, 752, 746
See application file for complete search history.

(56) References Cited

U.S. PATENT DOCUMENTS

| | | |
|---|---|---|
| 7,165,059 B1 | 1/2007 | Shah et al. |
| 7,206,987 B2 | 4/2007 | Roth et al. |
| 7,529,785 B1 | 5/2009 | Spertus et al. |
| 7,546,342 B2 | 6/2009 | Li et al. |
| 7,681,105 B1 | 3/2010 | Sim-Tang et al. |
| 7,685,109 B1 | 3/2010 | Ransil et al. |
| 7,693,877 B1 | 4/2010 | Zasman |
| 7,783,600 B1 | 8/2010 | Spertus et al. |
| 7,904,789 B1 * | 3/2011 | Rozas ........................... 714/763 |
| 7,930,611 B2 | 4/2011 | Huang et al. |
| 7,966,293 B1 | 6/2011 | Owara et al. |
| 8,166,369 B2 * | 4/2012 | Chuang et al. ............... 714/769 |
| 8,468,416 B2 * | 6/2013 | Gara et al. .................... 714/758 |
| 2003/0056139 A1 | 3/2003 | Murray et al. |
| 2004/0088331 A1 | 5/2004 | Therrien et al. |
| 2004/0193659 A1 | 9/2004 | Carlson et al. |
| 2005/0226143 A1 | 10/2005 | Barnhart et al. |

(Continued)

OTHER PUBLICATIONS

Baker et al., "Measurements of a Distributed File System", ACM, 1991, pp. 198-pp. 212.

(Continued)

*Primary Examiner* — Christine Tu
(74) *Attorney, Agent, or Firm* — Lee & Hayes, PLLC

(57) ABSTRACT

In some examples, an erasure code can be implemented to provide for fault-tolerant storage of data. Maximally recoverable cloud codes, resilient cloud codes, and robust product codes are examples of different erasure codes that can be implemented to encode and store data. Implementing different erasure codes and different parameters within each erasure code can involve trade-offs between reliability, redundancy, and locality. In some examples, an erasure code can specify placement of the encoded data on machines that are organized into racks.

20 Claims, 8 Drawing Sheets

(56) References Cited

U.S. PATENT DOCUMENTS

| | | |
|---|---|---|
| 2006/0064416 A1 | 3/2006 | Sim-Tang |
| 2006/0161635 A1 | 7/2006 | Lamkin et al. |
| 2006/0230076 A1 | 10/2006 | Gounares et al. |
| 2006/0271530 A1 | 11/2006 | Bauer |
| 2007/0100913 A1 | 5/2007 | Sumner et al. |
| 2007/0177739 A1 | 8/2007 | Ganguly et al. |
| 2007/0208748 A1 | 9/2007 | Li |
| 2007/0214314 A1 | 9/2007 | Reuter |
| 2008/0010513 A1 | 1/2008 | Devarakonda et al. |
| 2008/0052328 A1 | 2/2008 | Widhelm et al. |
| 2008/0198752 A1 | 8/2008 | Fan et al. |
| 2008/0221856 A1 | 9/2008 | Dubnicki et al. |
| 2008/0228687 A1 | 9/2008 | Devarakonda et al. |
| 2008/0313241 A1 | 12/2008 | Li et al. |
| 2009/0144224 A1 | 6/2009 | Phan et al. |
| 2009/0164533 A1 | 6/2009 | Hubbard |
| 2009/0193064 A1 | 7/2009 | Chen et al. |
| 2009/0265360 A1 | 10/2009 | Bachwani et al. |
| 2010/0192018 A1 | 7/2010 | Aiyer et al. |
| 2010/0199035 A1 | 8/2010 | Matsuo et al. |
| 2010/0218037 A1 | 8/2010 | Swartz et al. |
| 2010/0251002 A1 | 9/2010 | Sivasubramanian et al. |
| 2010/0274827 A1 | 10/2010 | Hix et al. |
| 2010/0293440 A1 | 11/2010 | Thatcher et al. |
| 2011/0029840 A1 | 2/2011 | Ozzie et al. |
| 2011/0035548 A1 | 2/2011 | Kimmel et al. |
| 2012/0060072 A1 | 3/2012 | Simitci et al. |
| 2012/0192037 A1 | 7/2012 | Gibson et al. |
| 2012/0246547 A1 | 9/2012 | Yekhanin et al. |
| 2013/0054549 A1 | 2/2013 | Gopalan et al. |

OTHER PUBLICATIONS

Cooley, et al., "Software-Based Erasure Codes for Scalable Distributed Storage", Proceedings of the 20th IEEE/11th NASA Goddard Conference on Mass Storage Systems and Technologies (MSS 2003), retrieved from the internet at <<http://ieeexplore.ieee.org/stamp/stamp.jsp?arnumber=01194852>>.

Dilley et al., "Globally Distributed Content Delivery", IEEE Internet Computing, 2002, 9 pages.

"Koh-i-Noor", retrieved from the internet on Aug. 19, 2009 at <<http://research.microsoft.com/en-us/projects/kohinoor/>>.

Li, et al., "Erasure Resilient Codes in Peer-to-Peer Storage Cloud", ICASSP 2006 IEEE, retrieved from the internet at <<http://ieeexplore.ieee.org/xpl/freeabs_all.jsp?tp=&arnumber=1660948&isnumber=34760>>.

Office action for U.S. Appl. No. 12/534,024, mailed on Aug. 2, 2012, Ozzie et al., "Erasure Coded Storage Aggregation in Data Centers", 47 pages.

"PA File Sight 3.7", retrieved from the internet Aug. 19, 2009 at <<http://www.poweradmin.com/file-sight>>.

Tang et al., "Differentiated Object Placement and Location for Self-organizing Storage Clusters", UCSB Technical Report, Nov. 2002, 14 pages.

Tang et al., "Sorrento: A Self-Organizing Storage Cluster for Parallel Data-Intensive Applications", UCSB, 2003, <http://www.cs.ucsb.edu/research/tech_reports/reports/2003-30.pdf.>, 14 pages.

Vogels, "File system usage in Windows NT 4.0", 17th ACM Symposium on Operating Systems Principles (SOSP'99), 1999, pp. 93-pp. 109.

Zhipeng et al., "Dynamic Replication Strategies for Object Storage Systems*", EUC Workshops 2006, LNCS 4097, pp. 53-pp. 61.

Aguilera, "Using Erasure Codes Efficiently for Storage in a Distributed System", In International Conference on Dependable Systems and Networks, Jun. 28, 2005, 20 pages.

Blaum, "Partial-MDS Codes and Their Application to RAID Type of Architectures", CoRR, May 2012, 36 pages.

"Coding for Networked Storage Systems", retrieved on Mar. 7, 2013 at <<http://sands.sce.ntu.edu.sg/CodingForNetworkedStorage/#>>, Nanyang Technological University, 11 pages.

Goldberg et al., "Towards an Archival Intermemory", Advances in Digital Libraries, 1998, 10 pages.

Karlsson et al., "A Framework for Evaluating Replica Placement Algorithms", Hewlett-Packard Company, 2002, 13 pages.

Kubiatowicz et al., "OceanStore: An Architecture for Global-Scale Persistent Storage", Proceedings of the Ninth International Conference on Architectural Support for Programming Languages and Operating Systems, 2000, 12 pages.

Lin et al., "A Decentralized Repair Mechanism for Decentralized Erasure Code based Storage Systems", IEEE 10th International Conference on Trust, Nov. 16, 2011, 8 pages.

Rawat et al., "Optimal Locally Repairable and Secure Codes for Distributed Storage Systems", In arXiv:1210.6954, Oct. 25, 2012, 18 pages.

Sathiamoorthy et al., "XORing Elephants", In arXiv preprint arXiv:1301.3791, Jan. 16, 2013, 16 pages.

Schechter, "On the Inversion of Certain Matrices", In Journal of Mathematical Tables and Other Aids to Computation, vol. 13, No. 66, May 1959, 5 pages.

* cited by examiner

LOCAL ERASURE CODES FOR DATA STORAGE

BACKGROUND

Typically, data centers employ various fault-tolerant data storage techniques in an attempt to provide efficient and reliable storage of large quantities of data. Conventional approaches involve added storage overhead in order to store replicated data and/or redundant data; each of which translates into high operating costs.

SUMMARY

Implementations described herein provide for fault-tolerant storage of data using erasure codes. Maximally recoverable cloud codes, resilient cloud codes, and robust product codes are examples of different erasure codes that can be implemented to encode and store data. Implementing different erasure codes and different parameters within each erasure code can involve trade-offs between reliability, redundancy, and locality. In some examples, an erasure code can specify placement of the encoded data on machines that are organized into racks.

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
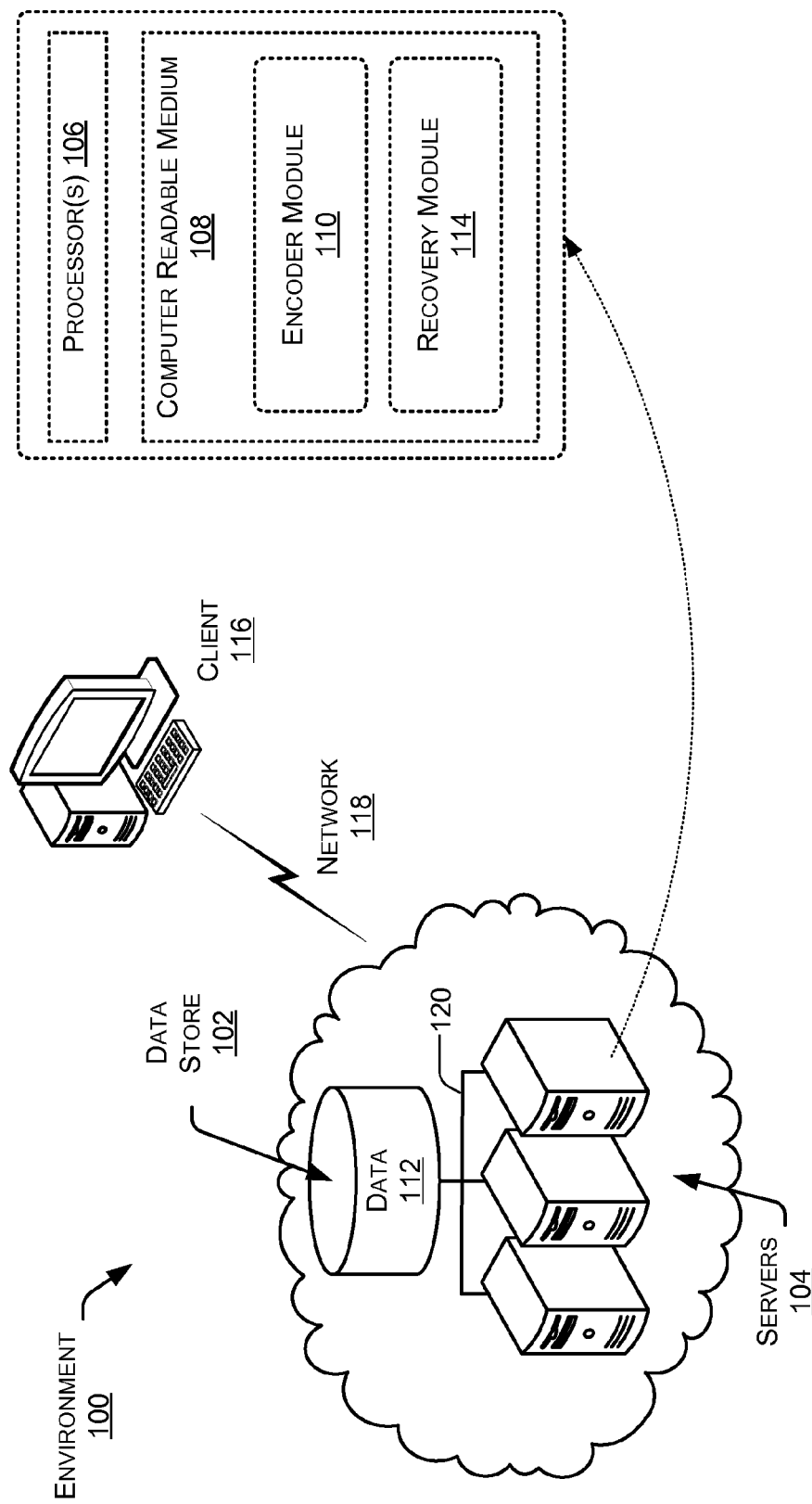
FIG. 1 is a block diagram illustrating an environment including select components for performing erasure coded data storage according to some implementations.

The technologies described herein are generally directed toward fault-tolerant storage of data. Data can be stored across multiple storage devices (servers, disks, etc.), which are often referred to as "machines." Machines can be arranged into a row, as a rack. Racks, in turn, can be arranged into multiple rows, resulting in a "grid" of machines that includes multiple rows and multiple columns of machines.

Three concepts associated with fault-tolerant data storage techniques are: reliability, redundancy, and locality. Reliability is associated with types of failures and quantities of failures that can be tolerated by a data storage system. Thus, reliability is based upon the ability to reconstruct data after one or more machines fails or becomes unavailable. Redundancy is associated with how much redundant data is stored by the data storage system. Smaller amounts of redundant data may be more desirable than larger amounts, since smaller amounts of redundant data use fewer resources. Locality is associated with how many machines are required to recover data after a machine fails. Thus, a lower locality can indicate a smaller amount of time for tasks, such as disk I/O and/or network transfer, is required to recover data. Different data storage techniques can involve different trade-offs between reliability, redundancy, and locality.

An erasure "code" can be implemented to store the data. The erasure code encodes the data using a particular type of code. The erasure code can also specify placement of the encoded data on machines and racks. As described herein, "Maximally recoverable cloud codes," "resilient cloud codes" and "robust product codes," are different types of erasure codes that can be implemented individually, in pairs, and/or simultaneously.

According to some implementations, the encoded data is stored in s racks, each of which includes m machines. The failure of one or more individual machines is a common failure mode. To recover data that was stored on the failed machine, it may be desirable to access a relatively small number of other machines. The number of machines accessed to recover from a single failure is the locality, r, of the code. In some implementations, d−1 total machine failures can be tolerated. Thus, the data can be recovered, even after d−1 machine failures. The failure of an entire rack of machines may be considered a catastrophic failure mode. The failure of an entire rack can be due to power failure, fire, etc. In this case, it may be desirable to ensure that no data is lost, even when d' additional machine failures occur before the lost rack is back online. Thus, d' denotes the number of machines failures that can be tolerated after the loss of a rack.

It is desirable to have a scheme with the above reliability guarantees that is maximally efficient with respect to storage overhead. Since higher storage overhead can translate into higher operating costs, once the encoder module 110 fixes the parameters s, m, r, d and d', it is desirable to maximize the amount of data that can be stored, while retaining the above reliability guarantees. In some implementations, one or more of the parameters s, m, r, d and d' are fixed.

Recovering from machine failures alone requires a certain amount of overhead as a function of s, m, r and d. Codes that meet this bound exactly may be referred to as "cloud codes." As described herein, a code that is additionally tolerant to rack failures may be referred to as a "resilient cloud code." Some implementations herein provide for a construction of resilient cloud codes for a range of values for the parameters s, m, r, d and d'.

Example Environment

FIG. 1 is a block diagram illustrating an environment 100 including select components for performing erasure coded data storage environment 100 according to some implementations. The environment 100 includes a data store 102 used for fault-tolerant data storage. Data store 102 can comprise any type of machines or storage devices suitable for fault-tolerant data storage.

In the illustrated example, the environment 100 includes one or more servers 104, which can each include one or more processors 106 and computer readable media 108. The processor 106 and the computer readable media 108 are described in further detail below.

The environment 100 can include various modules and functional components for performing the functions described herein. In some implementations, the environment 100 can include an encoder module 110 for encoding and storing data 112 in the environment 100, such as encoding and storing data 112 in the data store 102. Furthermore, a recovery module 114 can reconstruct a portion of the data 112 from the data store 102 in response to one or more failures of machines. For example, recovery module 114 can reconstruct a portion of the data 112 in response to one or more machines in data store 102 failing or becoming unavailable. In some examples, the functions performed by the encoder module 110 and the recovery module 114, along with other functions, can be performed by one module. Additional aspects of the encoder module 110 and the recovery module 114 are discussed below. Moreover, the environment 100 can be interconnected to one or more clients 116 and one or more other data centers via a network 118, such as the Internet, in order to access data 112. Furthermore, the one or more servers 104 can be interconnected via an intranet infrastructure (e.g., a local area network 120) within the environment 100.

Maximally Recoverable Cloud Codes

In some implementations, a "maximally recoverable cloud code" provides an error correction guarantee for data failures, called maximum recoverability. Maximum recoverability as used herein means that given all other constraints (e.g., optimal space overhead, locality, and the ability to correct any d−1 simultaneous failures) the code corrects the largest possible number of failure patterns of sizes above d−1. As shown below, by choosing coefficients using algebraic techniques, maximally recoverable cloud codes can be constructed with locality r and distance d for every setting of r and d.

In some implementations, a family of codes can be constructed that encode k data symbols, where k is an integer, into n=k+k/r+d−2 symbols such that the resulting code has locality r for every data symbol and distance d. Data symbols can be partitioned into k/r=g data groups $G_1$ through $G_g$. A group parity symbol can be stored for each of these groups as an additional element or member of each group. Additionally, d−2 "global" parity symbols can be stored. As used herein, "d−2" will be represented as "y." In some embodiments, each of the global parity symbols depends on all k data symbols. The global parity symbols form the last group $G_{g+1}$/(a parity group). The resulting groups are:

$$G_1 = \{X_{1,1}, \ldots, X_{r,1}\}$$
$$G_2 = \{X_{1,2}, \ldots, X_{r,2}\}$$
$$\ldots$$
$$G_g = \{X_{1,g}, \ldots, X_{r,g}\}$$
$$G_{g+1} = \{Y_1, \ldots, Y_y\}$$

where G denotes a group, X denotes a data symbol, and Y denotes a parity symbol.

In addition to correcting any d−1 failures, such as d−1 simultaneous or contemporaneous failures, a maximally recoverable cloud code can correct the largest possible number of failure patterns of sizes d and higher. In some implementations, the maximally recoverable cloud code corrects failure patterns that comprise a single failure in each data group (e.g., a failure in a data symbol or group parity symbol) and y additional arbitrary failures. In some implementations, recovering from the failures can comprise performing an exclusive-or of a group parity symbol of a group against surviving data symbols of the group to recover a failed data symbol of the group.

The following describes how global parities can be obtained for maximally recoverable cloud codes, given the data symbols. Data and parity symbols $\{X_{i,j}\}$ and $\{Y_i\}$ are treated as elements of a certain finite Galois field $F_{2^{ab}}$. To determine global parities, y linear equations over the variables $\{X_{i,j}\}$ and $\{Y_i\}$ need to be satisfied. $F_2 \subseteq F_{2^a} \subseteq F_{2^{ab}}$ can be a sequence of finite field extensions and $\{\lambda_1, \ldots, \lambda_{g+1}\} \subseteq F_{2^{ab}}$ can be a collection of elements such that any y of them are linearly independent over $F_{2^a}$. Such elements can be obtained, for example, from generalized Vandermonde matrices or from Cauchy matrices. Furthermore, $\omega \in F_{2^a}$ can be a proper element (e.g., an element that does not belong to any subfield). Thus, $\omega$ can be a primitive element of the same field (e.g., $F_{2^a}$). Finally, it can be assumed that a≥max{r, y}. The y linear equations can then be specified. For p∈{0, . . . , d−3}, the p-th equation is:

$$\sum_{j=1}^{g}\sum_{i=1}^{x}(\omega^i\lambda_j)^{2^P}X_{i,j} + \sum_{i=1}^{y}(\omega^i\lambda_{g+1})^{2^P}Y_i = 0$$

where X denotes a data symbol, Y denotes a global parity symbol, $\omega$ denotes a proper element, $\lambda$ denotes an element as described above, x=r denotes the number of data symbols per group, y denotes the number of global parities, and g denotes the number of groups.

It can be verified that the equations above guarantee maximal recoverability. The equations above also allow one to obtain explicit maximally recoverable cloud codes over small finite fields. For example, for k=60, r=4, d=6, one can set a to "4," b to "4," and set $\{\lambda_i\} \in F_{2^{16}}$ to obtain an explicit maximally recoverable code over the field $F_{2^{16}}$.

In some implementations, recovering from failures involves solving y+g equations. The first g equations are, with j=1 to g:

$$\sum_{i=1}^{x} X_{i,j} = Z_j,$$

where x denotes the number of data symbols per group, X denotes a data symbol, and Z denotes a group parity symbol, and the next y equations are:

$$\Sigma_{j=1}^{g}\Sigma_{i=1}^{x}(\omega^i\lambda_j)^{2^P}X_{i,j}+\Sigma_{i=1}^{y}(\omega^i\lambda_{g+1})^{2^P}Y_i=0,$$

where x denotes the number of data symbols per group, X denotes a data symbol, Y denotes a global parity symbol, $\omega$ denotes a proper element, $\lambda$ denotes an element as described above, y denotes the number of global parities, and g denotes the number of groups. In some implementations, the groups parity symbol for a group is created or generated by performing an exclusive-or of the data symbols of the group.

Figure 2:
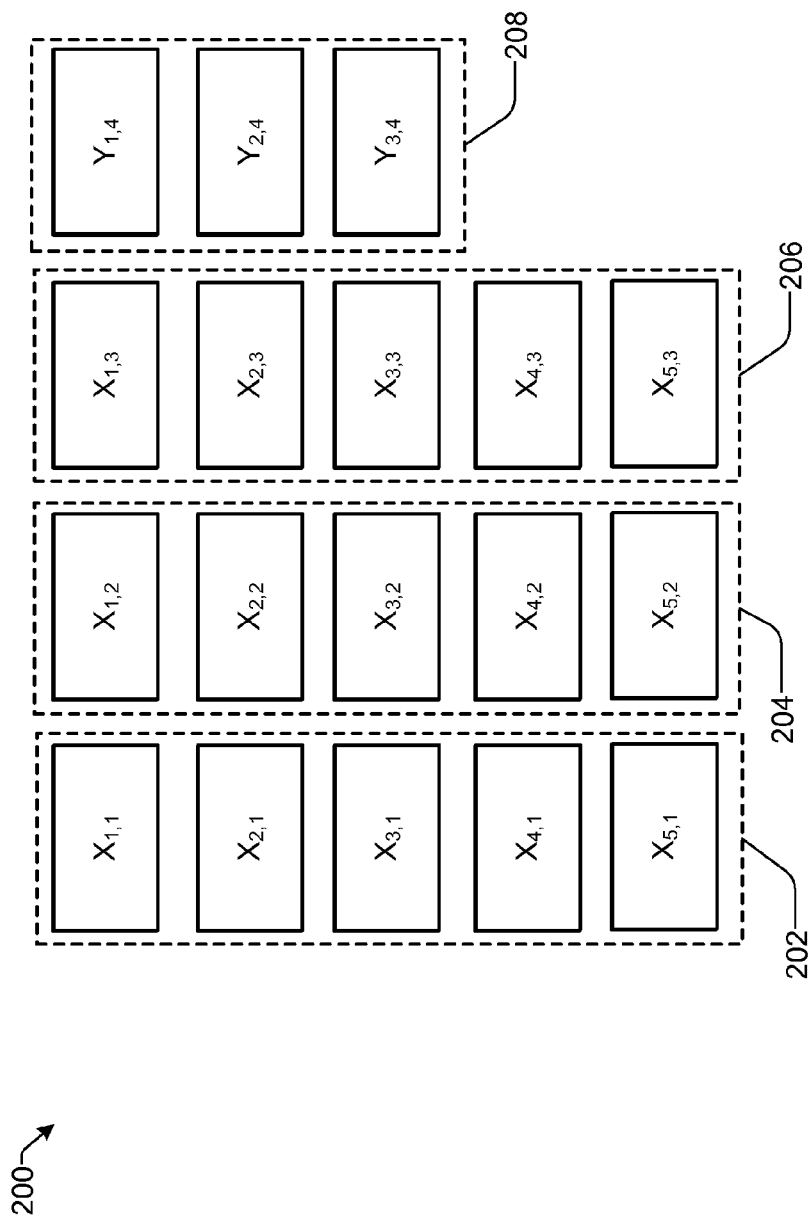
FIG. 2 illustrates an example of a maximally recoverable cloud code according to some implementations.

FIG. 2 illustrates an example of a maximally recoverable cloud code 200 according to some implementations. Each data symbol is stored on a different machine. The machines can be all or a part of data store 102 of the environment 100. In the example, the maximally recoverable cloud code 200 is used with k=12, r=4 and d=5. The data symbols $X_{1,1}$, $X_{2,1}$, $X_{3,1}$ and $X_{4,1}$ and the parity symbol $X_{5,1}$ form data group 202. The data symbols $X_{1,2}$, $X_{2,2}$, $X_{3,2}$ and $X_{4,2}$ and the parity symbol $X_{5,2}$ form data group 204. The data symbols $X_{1,3}$, $X_{2,3}$, $X_{3,3}$ and $X_{4,3}$ and the parity symbol $X_{5,3}$ form data group 206. The global parity symbols $Y_{1,4}$, $Y_{2,4}$ and $Y_{3,4}$ form parity group 208. The maximally recoverable cloud code 200 has a fault tolerance of a single failure per data group plus three arbitrary additional failures.

Resilient Cloud Codes

In some implementations, a "resilient cloud code" is similar to the maximally recoverable cloud codes above, but provides additional fault tolerance by using additional parities and specifying a placement strategy for data symbols and parity symbols. In some implementations, k data symbols of the same size or approximately the same size are stored in machines across s racks. In some implementations, the resilient cloud code is based on the maximally recoverable cloud code described above, with r=s−1 and d=r+2=s+1. Data symbols are arranged into g=k/r groups $G_1$ through $G_g$, and for each group, a parity of the group is also stored with the group. There are also d−2=y=r global parity symbols that form the last group $G_{g+1}$. Each global parity symbol depends on all k data symbols. In some embodiments, each global parity symbol depends on one or more of the k data symbols. For resilient cloud codes, the parity of all of the global parities is also stored, which increases by one the number of simultaneous failures that can be tolerated. Furthermore, in some embodiments, the data symbols and parity symbols are stored in rows and columns of the machines. Each data symbol and parity symbol are stored on different machines (e.g. different failure domains).

In some implementations, global parities can be obtained in a similar way as for maximally recoverable cloud codes, described above. For $p \in \{0, \ldots, r-1\}$, the p-th equation is:

$$\sum_{j=1}^{g} \sum_{i=1}^{x} (\omega^i \lambda_j)^{2^P} X_{i,j} + \sum_{i=1}^{x} (\omega^i \lambda_{g+1})^{2^P} Y_i = 0$$

where X denotes a data symbol, Y denotes a global parity symbol, w denotes a proper element as described above, λ denotes an element as described above, x=r denotes the number of data symbols per group, and g denotes the number of data groups. In some implementations, x=r denotes the number of the columns. In some implementations, g denotes the number of rows.

In some implementations, recovering from failures involves solving g+x+1 equations. The first g equations are, with j=1 to g:

$$\sum_{i=1}^{x} X_{i,j} = Z_j,$$

where x denotes the number of columns, X denotes a data symbol and Z denotes a group parity symbol, where a group parity symbol for a group can be obtained by performing an exclusive-or of the data symbols for the group, and the g+1 equation is:

$$\sum_{i=1}^{x} Y_i = Z_{g+1},$$

where Y denotes a global parity symbol, $Z_{g+1}$ is the parity of the global parity symbols, which can be obtained by performing an exclusive-or of the global parity symbols, x denotes the number of columns, and g denotes the number of rows, and the next x equations with P=0 . . . x−1 are:

$$\Sigma_{j=1}^{g} \Sigma_{i=1}^{x} (\omega^i \lambda_j)^{2^P} X_{i,j} + \Sigma_{i=1}^{x} (\omega^i \lambda_{g+1})^{2^P} Y_i = 0,$$

where X denotes a data symbol, Y denotes a global parity symbol, w denotes a proper element, λ denotes an element as described above, x denotes the number of columns, and g denotes the number of rows. In some implementations, the groups parity symbol for a group is created or generated by performing an exclusive-or of the data symbols of the group.

In some implementations, a placement strategy is also followed. The placement strategy specifies how to optimally place data symbols and parity symbols across machines and racks. In some implementations, the placement strategy should satisfy the following two constraints: 1) no two symbols reside on the same machine; and 2) for each group $G_i$, $i \in \{1, \ldots, g+1\}$ the r symbols in the group and the group parity should reside on different racks.

The choice of coefficients as discussed above for the maximally recoverable cloud codes, as well as the above placement strategy, yields explicit codes over small fields that exhibit optimal tradeoffs between locality, reliability, and redundancy, even in the scenario of losing an entire rack. In particular, the following three guarantees are obtained: 1) if any one machine is unavailable, the data on it can be reconstructed by accessing r other machines; 2) the code tolerates any d simultaneous machine failures; and 3) the code tolerates any y simultaneous machine failures after losing an entire rack.

In some implementations, encoder module 110 generates a number of global parity symbols that is equal to the number of the columns, in order to form the global parity group. In some implementations, encoder module 110 generates a group parity symbol by performing an exclusive-or of the data symbols of the corresponding data group. In some implementations, encoder module 110 generates the parity of all of the global parities by performing an exclusive-or of the global parity symbols.

In some implementations, resilient cloud codes allow recovery from failures that comprise up to one failure in each the data groups and in the global parity group. Furthermore, recovering from failures can comprise performing an exclusive-or of a group parity symbol of a data group against surviving data symbols of the data group to recover a failed data symbol of the group. In some implementations, recovering from failures may comprise performing an exclusive-or of the second global parity symbol against surviving first global parity symbols of the global parity group to recover a failed first global parity symbol of the global parity group.

Figure 3:
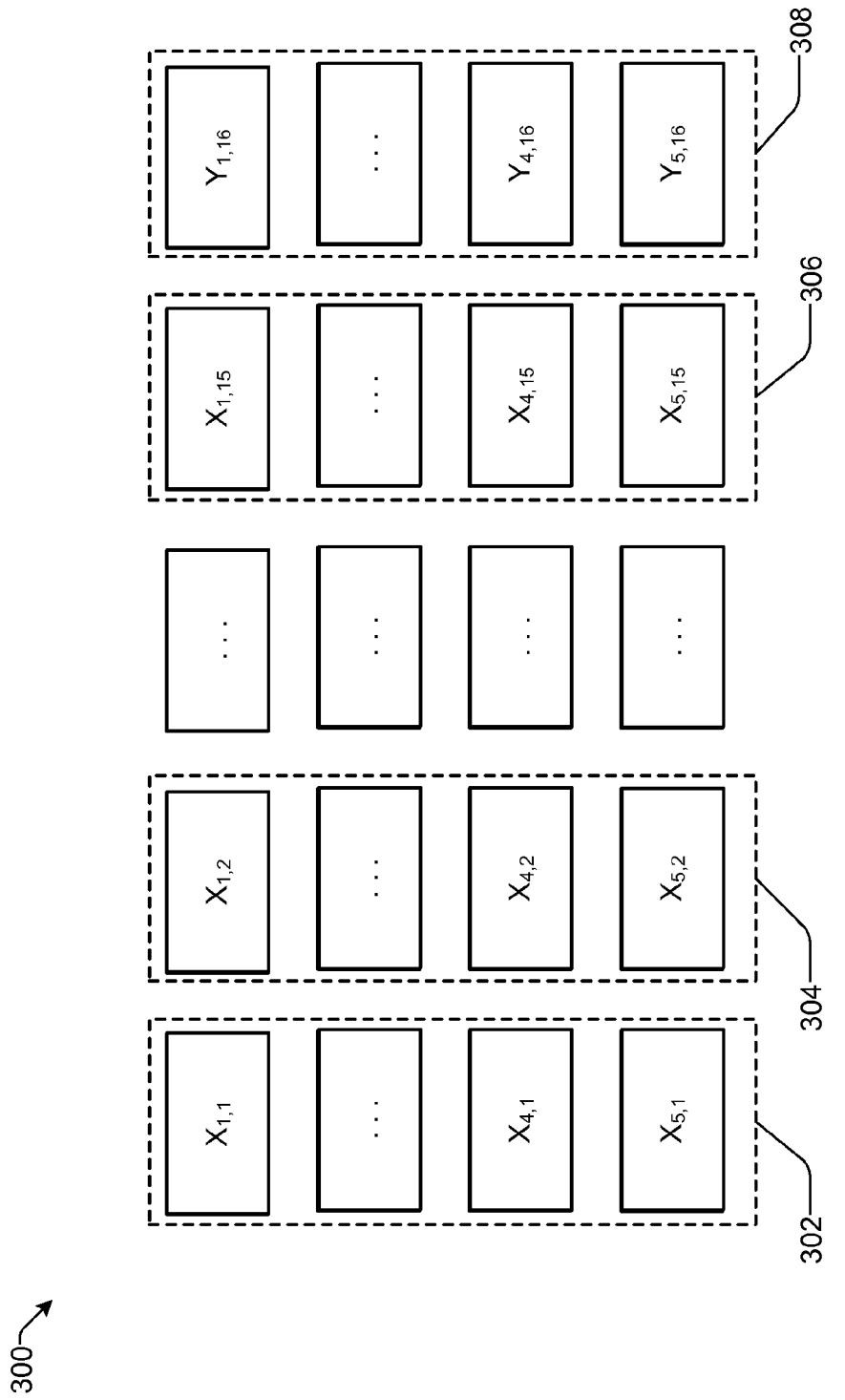
FIG. 3 illustrates an example of a resilient cloud code according to some implementations.

FIG. 3 illustrates an example of a resilient cloud code 300 according to some implementations. In the example, the resilient cloud code 300 is used with k=60 and r=4, placed across five racks. In the example, each symbol is stored on a different machine. The machines can be all or a part of data store 102 of the environment 100. There are 15 data groups and one parity group. In the example, rows correspond to racks and columns correspond to data groups or a parity group. The data symbols $X_{1,1}, \ldots X_{4,1}$ and the parity symbol $X_{5,1}$ form data group 302. The data symbols $X_{1,2}, \ldots X_{4,2}$ and the parity symbol $X_{5,2}$ form data group 304. The data symbols $X_{1,15}, \ldots X_{4,15}$ and the parity symbol $X_{5,15}$ form data group 306. The global parity symbols $Y_{1,16}, \ldots Y_{5,16}$ form global parity group 308. In the example, each parity symbol of the bottom row stores the column parity of its column. The resilient cloud code 300 provides the following guarantees: 1) if any one machine becomes unavailable, the data on it can be reconstructed by accessing four or more other machines; 2) up to any six simultaneous machine failures is tolerated; and 3) after losing an entire rack, up to any four simultaneous machine failures is tolerated.

Robust Product Codes

Product encoding is a type of erasure encoding that can provide good locality and low redundancy. For a basic product code, data symbols (also referred to a "data chunks") from a single stripe are arranged in an A-by-B grid of data symbols. A stripe can be a sequence of data, such as a file, that is logically segmented such that consecutive segments are stored on different physical storage devices. R parity symbols (also referred to a "parity chunks") are generated for every row using a predefined erasure code (e.g., a Reed Solomon code or other erasure code). A parity symbol is generated for every column. (A+1)*(B+R) symbols are distributed across (A+1)*(B+R) different machines. Data symbols and parity symbols can have internal checksums to detect corruption, so upon decoding, bad symbols can be identified. A missing data or parity symbol can be recovered from the symbol in the same row or the symbol in the same column, assuming a sufficient number of the symbols are available. Different values of A, B and R can provide tradeoffs between reliability, availability, and space overhead.

In some implementations, a "robust product code" provides a more reliable product code by using different codes to encode different rows. With an appropriate choice of row-codes and column-codes, robust product codes correct all patterns of failures that are correctable by basic product codes, and many more.

A data storage system that uses a robust product code partitions stripes into chunks of data of roughly equal size (data symbols), encodes each stripe separately using the robust product code, and stores the data symbols of a single stripe in different failure domains (e.g. different machines, storage devices, etc.) to ensure independence of failures. Thus, each data symbol is stored on a different failure domain than the each of the other data symbols.

At the encoding stage, data symbols $\{X_{ij}\}$ are arranged in an A-by-B grid, where A and B are fixed integers). The data symbols can be considered elements of a finite Galois field. Then, R parity symbols are generated for every row. Each row parity symbol is a linear combination of the corresponding data symbols with coefficients. Thus, the j-th parity symbol for the i-th row is given by $P_{i,(B+j)} = \Sigma_{s=1}^{B} \alpha_{i,j,s} X_{i,s}$. Different coefficients $\{\alpha_{i,j,s}\}$ are used to define parities in different rows. Finally, one parity chunk is generated for each of (B+R) columns. Each column parity chunk is a simple sum of the corresponding column chunks (See FIG. 4). In some implementations, each column parity is a simple exclusive-or of data symbols of a column corresponding to the column parity.

Figure 4:
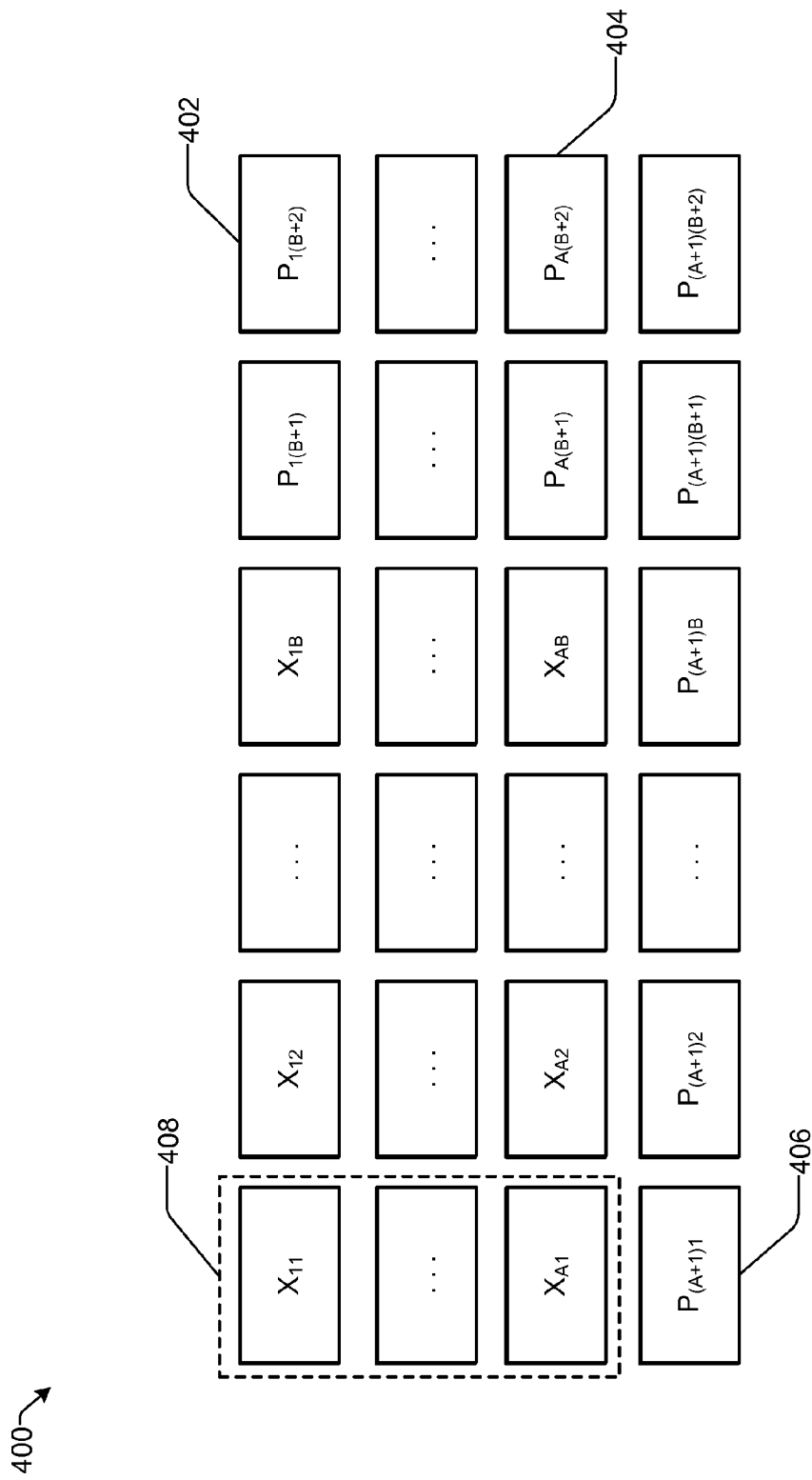
FIG. 4 illustrates an example of a robust product code according to some implementations.

FIG. 4 illustrates an example of a robust product code 400 according to some implementations. In the example, the robust product code 400 with two parities per row (R=2). In the example, each symbol is stored on a different machine. The machines can be all or a part of data store 102 of the environment 100. Different codes are used to perform encoding in A different data rows. For example, the code used to encode parity symbol 402 is different than the code used to encode parity symbol 404. Every row parity chunk is a linear combination of the corresponding data chunks with coefficients. Thus for all $i \in [1 \ldots A]$, $j \in \{1,2\}$, $P_{i,(B+j)} = \Sigma_{s=1}^{B} \alpha_{i,j,s} X_{i,s}$. Each column parity chunk is a simple sum of the corresponding column chunks. For example, the column parity chunk 406 is a simple sum of the column chunks 408. In some implementations, rows in a grid are spread across physical racks as much as possible. In some implementations, columns have at most one symbol per rack.

Properties of the robust product code are governed by the choice of coefficients $\{\alpha_{i,j,s}\}$ used to define the parity symbols. If one chooses these coefficients generically from a sufficiently large finite field, the following properties hold: 1) the robust product code corrects all patterns of simultaneous failures that are correctable by the basic product code with the same parameters (A, B, and R); 2) unlike the basic product code, the robust product code corrects all 2-by-(R+1) patterns of failures that do not involve the parity row; and 3) the robust product code corrects many other patterns of simultaneous failures that are uncorrectable by the basic product code.

There are many ways to fix coefficients $\{\alpha_{i,j,s}\}$ explicitly in a small field to get a subset of these three properties. The following is an example of choosing coefficients, assuming R=2. Let F be a finite field and size 2A+B or more and characteristic two. Let $\{a_j\}_{1 \leq j \leq B+2}$, $\{b_i\}_{1 \leq i \leq A}$ and $\{c_i\}_{1 \leq i \leq A}$ be some arbitrary 2A+B+2 distinct elements of F. As in FIG. 4, AB data symbols are arranged in an A×B grid. The element in location (i, j) is denoted by $X_{i,j}$. Each row is protected by two parity symbols. For the i-th row, these parity symbols are denoted by $X_{i,B+1}$ and $X_{i,B+2}$. The coefficients $\{\alpha_{i,j,s}\}$ and $\{\beta_{i,j,s}\}$ are fixed in such a way that for each $i \leq A$:

$$\begin{cases} \sum_{j=1}^{B+2} \dfrac{X_{i,j}}{b_i + a_j} = 0, \\ \sum_{j=1}^{B+2} \dfrac{X_{i,j}}{c_i + a_j} = 0. \end{cases}$$

Every column $j \leq B+2$ is protected by a single parity symbol $X_{A+1,j} = \Sigma_{i=1}^{A} X_{i,j}$. The code specified above has the following four properties: 1) each column $j \leq B+2$ corrects a single erasure; 2) each row $i \leq A$ corrects up to two erasures (this does not apply to the last row); 3) every 2×4 pattern of erasures that does not involve the bottom row is correctable; and 4) every 2×3 pattern of erasures that does not involve the bottom row is correctable. Thus, in some implementations, the robust product code corrects a failure pattern with a width of up to a number of the row parity symbols per row plus one and a height of two. In some implementations, the failure pattern does not involve the column parity row (e.g., the bottom row in the above example). The improvement in reliability provided by robust product codes can be particularly important when the number of failure domains in a data center cluster is smaller than the number of chunks per stripe, where a failure domain is a group of machines, since losing multiple chunks per stripe becomes much more probable.

In some implementations, R>2. Thus, in some implementations, generating row parity symbols comprises obtaining coefficients of the row parity symbols by solving A times R equations, with i from 1 to A and k from 1 to R, where the equations are:

$$\sum_{j=1}^{B+2} \frac{X_{i,j}}{b_{i,k} + a_j} = 0,$$

wherein $X_{i,j}$ is a data symbol, A is the number of rows, B is the number of rows, R is a number of parities per row, $\{a_j\}_{1 \le j \le B+R}$ is a set of distinct elements on Galois Field F, $\{b_{i,k}\}_{1 \le i \le A, 1 \le k \le R}$ is another set of distinct elements on the Galois Field F, and $a_j$ and $b_{i,k}$ are distinct so that no two elements are equal.

Example Processes

In the following flow diagrams, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the process. While several examples are described herein for explanation purposes, the disclosure is not limited to the specific examples, and can be extended to additional devices, environments, applications and settings. For discussion purposes, the processes below are described with reference to the environment 100 of FIG. 1, although other devices, systems, frameworks, and environments can implement this process.

Figure 5:
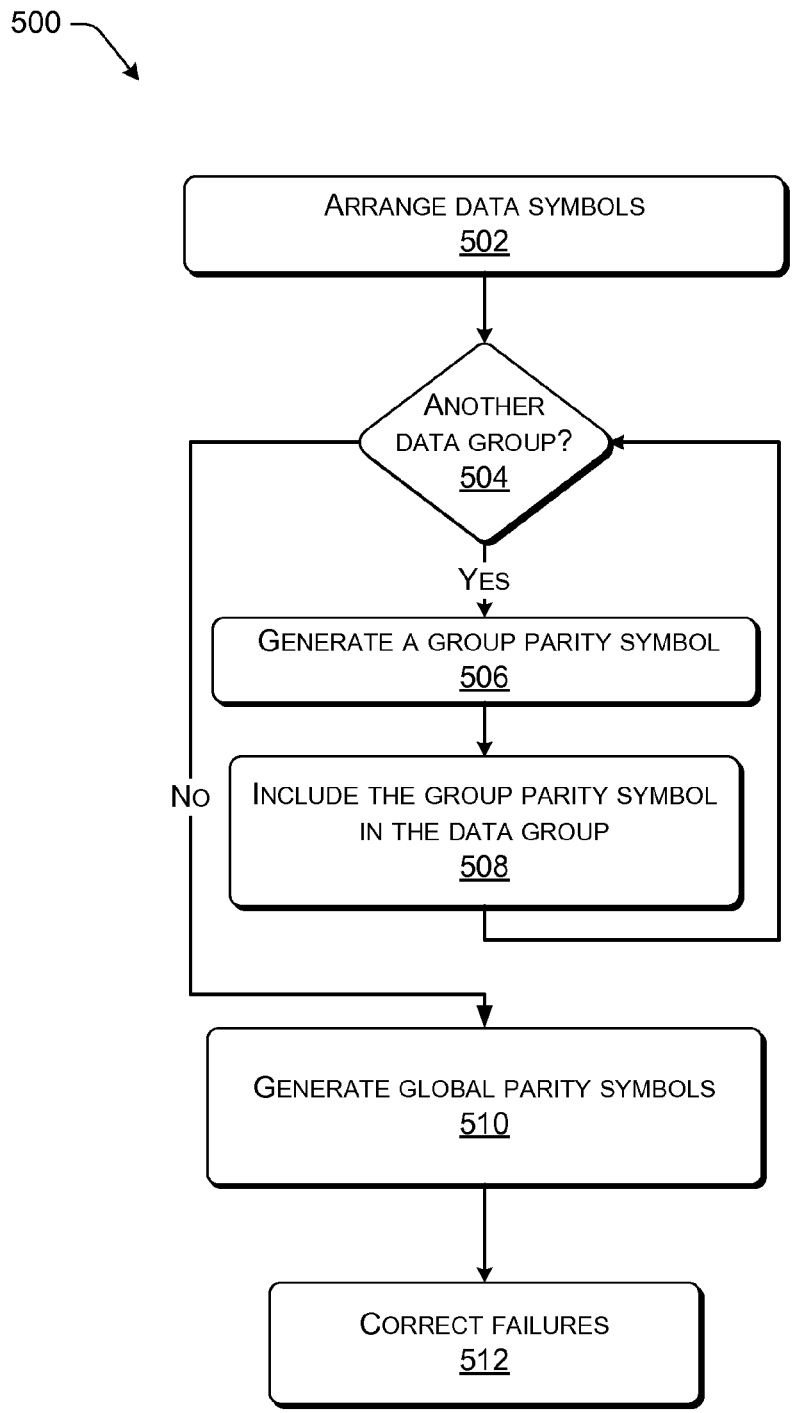
FIG. 5 is a flow diagram of an example process of performing erasure coded data storage using a maximally recoverable cloud code according to some implementations.

FIG. 5 is a flow diagram of an example process 500 of performing erasure coded data storage using a maximally recoverable cloud code according to at least one embodiment. At step 502, the encoder module 110 arranges data symbols. In some embodiments, the data symbols are arranged into data groups. At step 504, the encoder module 110 determines if there is another data group to process. If the encoder module 110 determines that there is another data group to process, then at step 506, the encoder module 110 generates a group parity symbol for the data group. At step 508, the encoder module 110 includes the group parity symbol in the data group. The process then returns to step 504. At step 504, if the encoder module 110 determines that there is not another data group to process, then at step 510, the encoder module 110 generates global parity symbols. In some embodiments, each global parity symbol is based on the data symbols. In some embodiments, each global parity symbol is based on all of the data symbols. In other embodiments, each global parity symbol is based on one or more of the data symbols. At step 512, the recovery module 114 corrects failures. In some embodiments, each of the failures is associated with one of the data symbols or one of the group parity symbols. In some embodiments, at most one failure is associated with a particular data symbol or group parity symbol. In some implementations, the recovery module 114 corrects a number of failures that is at least equal to a number of the global parity symbols.

Figure 6:
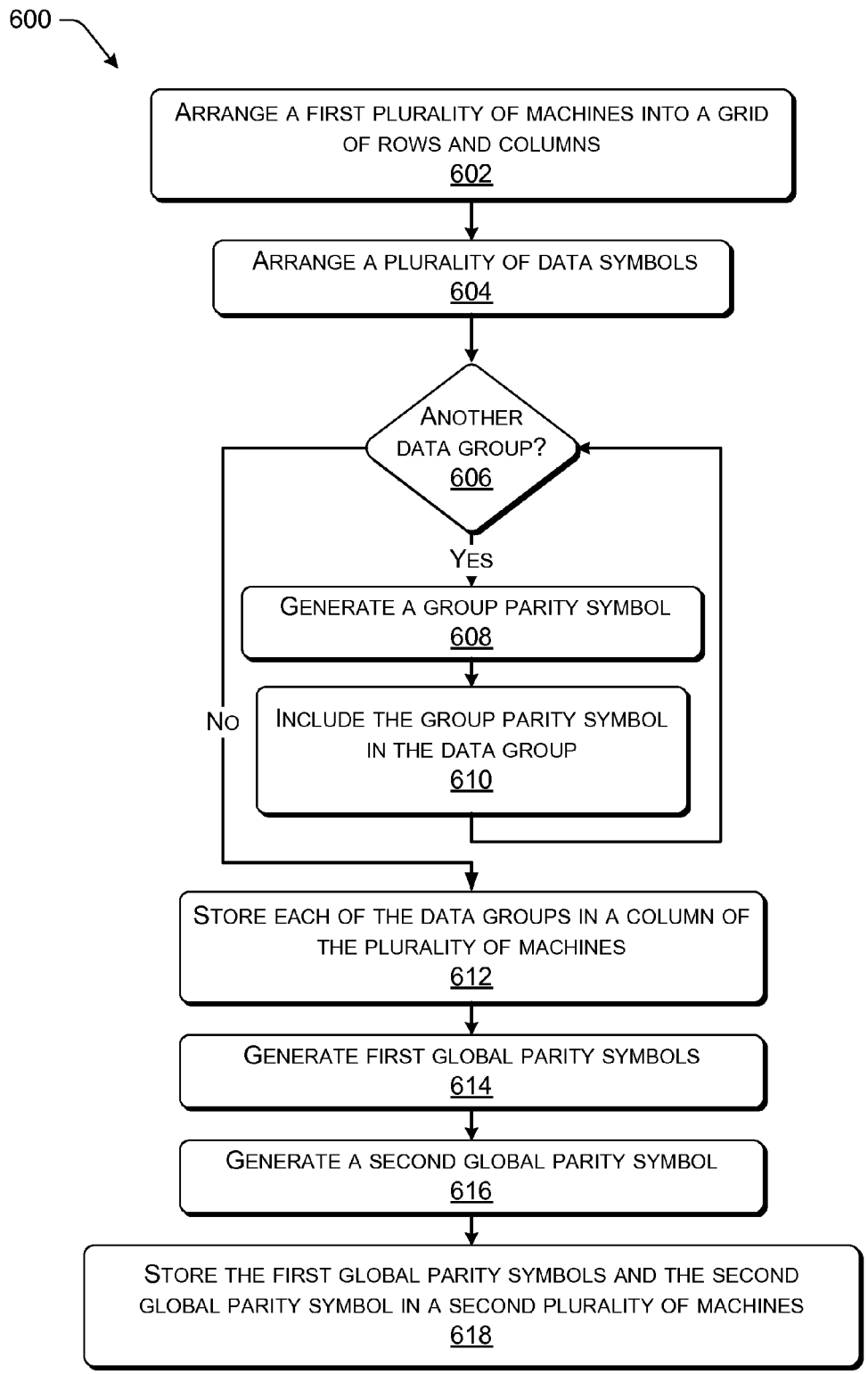
FIG. 6 is a flow diagram of an example process of performing erasure coded data storage using a maximally recoverable cloud code according to some implementations.

FIG. 6 is a flow diagram of an example process 600 of performing erasure coded data storage using a resilient cloud code according to at least one embodiment. At step 602, the encoder module 110 arranges a first plurality of machines. In some embodiments, the first plurality of machines is arranged into a grid of rows and columns. In some embodiments, each row corresponds to one of a plurality of racks. At step 604, the encoder module 110 arranges a plurality of data symbols into data groups.

At step 606, the encoder module 110 determines if there is another data group to process. If the encoder module 110 determines that there is another data group to process, then at step 608, the encoder module 110 generates a group parity symbol. At step 610, the encoder module 110 includes the group parity symbol in the data group. The process then returns to step 606. At step 606, if the encoder module 110 determines that there is not another data group to process, then at step 612, the encoder module 110 stores each of the data groups in a column of the first plurality of machines. In some embodiments, no two symbols are stored on a same machine.

At step 614, the recovery module 114 generates one or more first global parity symbols. In some embodiments, each first global parity symbol is based on the data symbols. In some embodiments, each first global parity symbol is based on all of the data symbols. In other embodiments, each first global parity symbol is based on one or more of the data symbols. At step 616, the recovery module 114 generates a second global parity symbol. In some embodiments, the second global parity symbol is based on all of the first global parity symbols. In other embodiments, the second global parity symbol is based on one or more of the first global parity symbols. At step 616, the recovery module 114 stores the first global parity symbols and the second global parity symbol in a second plurality of machines. In some embodiments, each of the second plurality of machines belongs to one of the plurality of racks. In some embodiments, no two symbols are stored on a same machine.

Figure 7:
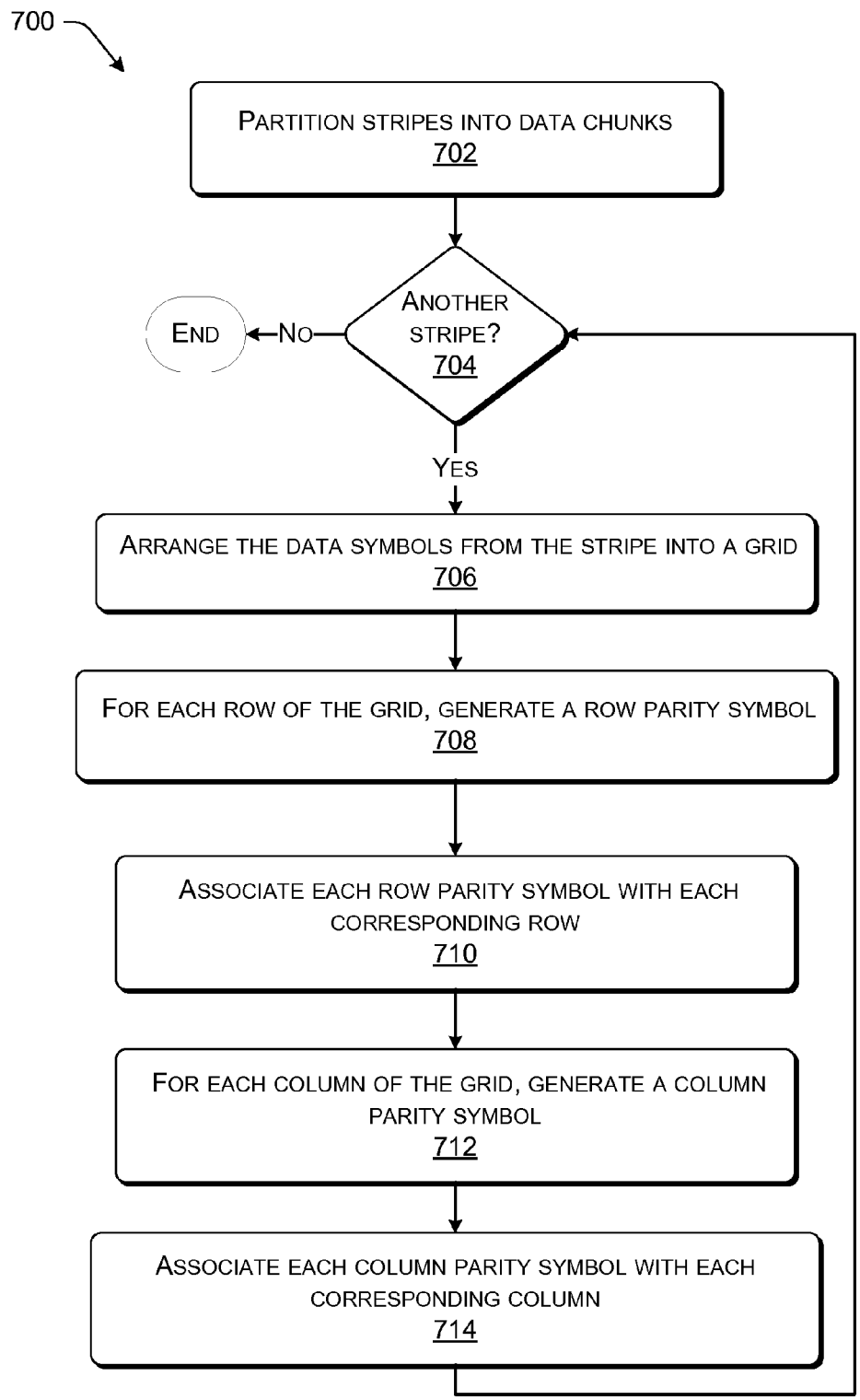
FIG. 7 is a flow diagram of an example process of performing erasure coded data storage using a robust product code according to some implementations.

FIG. 7 is a flow diagram of an example process 700 of performing erasure coded data storage using a robust product code according to at least one embodiment. At step 702, the encoder module 110 partitions stripes into data chunks to form data symbols. At step 704, if the encoder module 110 determines that there is another stripe to process. If there is not another stripe to process, then process 700 ends. If there is another stripe to process, then at step 706, the encoder module 110 arranges the data symbols into a grid comprising a first number of rows and a second number of columns.

At step 708, for each row of the grid, the encoder module 110 generates one or more row parity symbols. In some embodiments, each row parity symbol is generated using a code that is different than each code used to generate row parity symbols for other rows of the grid. In some embodiments, each row parity symbol is based on data symbols of the corresponding row. In some embodiments, each row parity symbol is based on all data symbols of the corresponding row. In other embodiments, each row parity symbol is based on one or more data symbols of the corresponding row. At step 710, the encoder module 110 associates each row parity symbol with each corresponding row to form one or more row parity columns of the grid that comprise each row parity symbol. At step 712, for each column of the grid, the encoder module 110 generates a column parity symbol. In some embodiments, the column parity symbol is based on data symbols of the column. At step 714, the encoder module 110 associates each column parity symbol with each corresponding column to form a column parity row of the grid that comprises each column parity symbol. In some implementations, the recovery module 114 corrects at least a number of failures that is at least equal to a number of the global parity symbols.

Example Computing System

Figure 8:
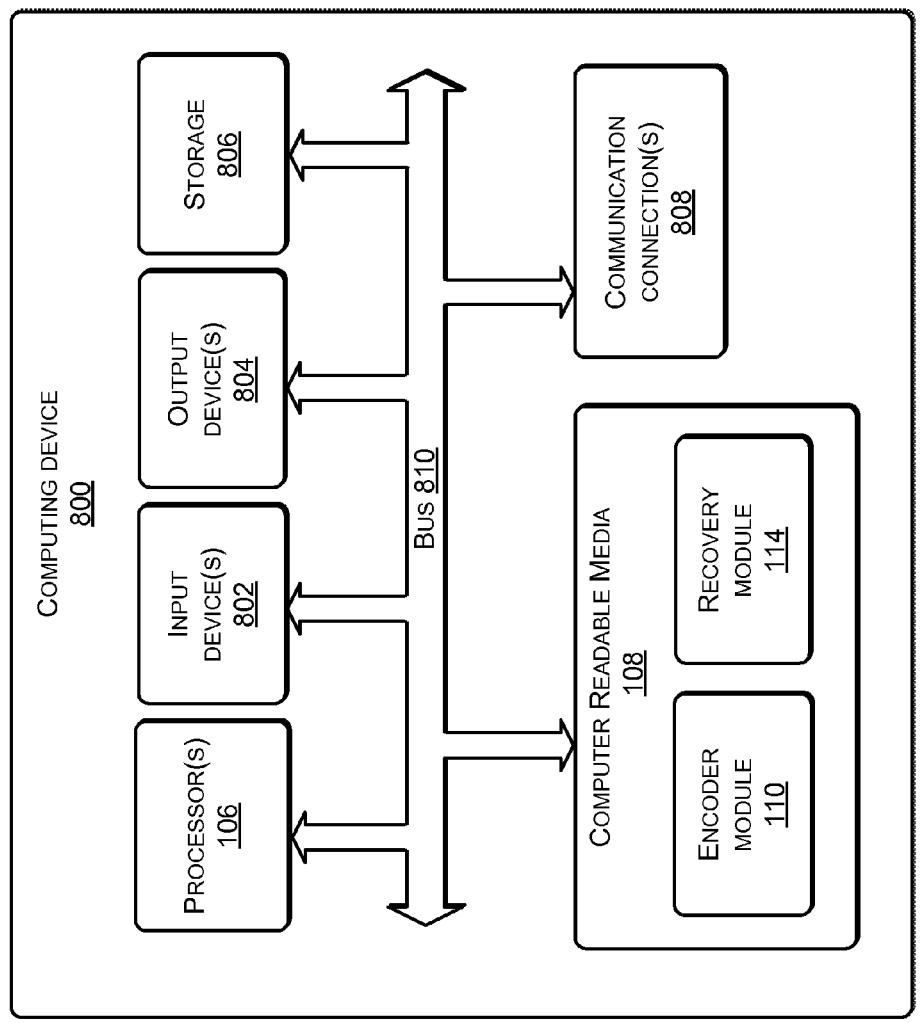
FIG. 8 is a block diagram illustrating a representative computing device that can implement erasure coded storage.

FIG. 8 is a block diagram illustrating a representative computing device 800 that can implement erasure coded storage. For example, the computing device 800 can be a server, such as one of the servers 104, as described in FIG. 1. However, it will be readily appreciated that the techniques and mechanisms can be implemented in other computing devices, systems, and environments. The computing device 800 shown in FIG. 8 is only one example of a computing device and is not intended to suggest any limitation as to the scope of use or functionality of the computer and network architectures.

In the illustrated example, the computing device 800 includes one or more processors 106, one or more computer-readable media 108 that includes the encoder module 110 and the recovery module 114, one or more input devices 802, one or more output devices 804, storage 806 and one or more communication connections 808, all able to communicate through a system bus 810 or other suitable connection.

In some implementations, the processor 106 is a microprocessing unit (MPU), a central processing unit (CPU), or other processing unit or component known in the art. Among other capabilities, the processor 106 can be configured to fetch and execute computer-readable processor-accessible instructions stored in the computer-readable media 108 or other computer-readable storage media. Communication connections 808 allow the device to communicate with other computing devices, such as over a network 108. These networks can include wired networks as well as wireless networks.

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media can embody computer-readable instructions, data structures, program modules, or other data in a modulated data signal, such as a carrier wave. As defined herein, computer storage media does not include communication media.

Computer-readable media 108 can include various modules and functional components for enabling the computing device 800 to perform the functions described herein. In some implementations, computer-readable media 108 can include the encoder module 110 for performing erasure coded data storage and operations related to erasure coded data storage. For example, the encoder module 110 can perform erasure coded data storage for data store 102 using a maximally recoverable cloud code, a resilient cloud code or a robust product code. In response to the detecting a failure of one or more machines in the data store 102, the recovery module 114 can reconstruct data that resided on the failed one or more machines in the data store 102. The encoder module 110 and/or the recovery module 114 can include a plurality of processor-executable instructions, which can comprise a single module of instructions or which can be divided into any number of modules of instructions. Such instructions can further include, for example, drivers for hardware components of the computing device 100.

The encoder module 110 and/or the recovery module 114 can be entirely or partially implemented on the computing device 800. Although illustrated in FIG. 8 as being stored in computer-readable media 108 of computing device 800, the encoder module 110 and the Recovery module 114, or portions thereof, can be implemented using any form of computer-readable media that is accessible by computing device 800. In some implementations, the encoder module 110 and/or the recovery module 114 are implemented partially on another device or server. Furthermore, computer-readable media 108 can include other modules, such as an operating system, device drivers, program data, and the like, as well as data used by the encoder module 110 and other modules.

Computer-readable media 108 or other machine-readable storage media stores one or more sets of instructions (e.g., software) embodying any one or more of the methodologies or functions described herein. The instructions can also reside, completely or at least partially, within the computer-readable media 108 and within processor 106 during execution thereof by the computing device 800. The program code can be stored in one or more computer-readable memory devices or other computer-readable storage devices, such as computer-readable media 108. Further, while an example device configuration and architecture has been described, other implementations are not limited to the particular configuration and architecture described herein. Thus, this disclosure can extend to other implementations, as would be known or as would become known to those skilled in the art.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and can be implemented in general purpose and special-purpose computing systems, or other devices having processing capability. Generally, any of the functions described with reference to the figures can be implemented using software, hardware (e.g., fixed logic circuitry) or a combination of these implementations. Thus, the processes, components and modules described herein can be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one example" "some examples," "some implementations," or similar phrases means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
arranging a set of data symbols into a plurality of data groups so that each data group in the plurality of data groups includes a subset of the set of data symbols;
for each data group in the plurality of data groups:
generating a group parity symbol based on the subset of the set of data symbols included in the data group; and
including the group parity symbol in the data group;
storing the plurality of data groups across a first set of machines;
generating at least two global parity symbols, wherein each of the at least two global parity symbols is generated based on all the data symbols in the set of data symbols;
including the at least two global parity symbols in a global parity group;
storing the global parity group across a second set of machines that is different than the first set of machines; and
recovering from failures, wherein the failures comprise:
up to a first failure associated with any one symbol included in each data group of the plurality of data groups;
up to a number of additional failures associated with additional symbols of the plurality of data groups and the at least two global parity symbols in the global parity group, wherein the number of additional failures is up to a number of the at least two global parity symbols; and
wherein generating the at least two global parity symbols comprises solving b equations with P=0, b−1, wherein the b equations comprise:
setting a first sum plus a second sum equal to zero, wherein:
the first sum comprises a sum from j=1 to g of:
a sum from i=1 to r of:
a product of $\omega^i$ and $\lambda_j$, raised to a power of $2^P$, and multiplied by $X_{i,j}$;
and
the second sum comprises a sum from i=1 to b of:
a product of $\omega^i$ and $\lambda_{g+1}$, raised to a power of $2^P$, and multiplied by $Y_i$,
wherein $X_{i,j}$ is a data symbol, $Y_i$ is a global parity symbol, g is a number of the plurality of data groups, r is a number of data symbols per data group, b is the number of global parity symbols, $\{\lambda_1, \ldots, \Delta_{g+1}\}$ is a collection of elements such that any b of them are linearly independent in a particular field, and co is a primitive element of the particular field.

2. The method of claim 1, wherein for each data group in the plurality of data groups, the group parity symbol is based upon an exclusive-or of the subset of the set of data symbols included in the data group.

3. The method of claim 1, wherein recovering from the failures comprises performing an exclusive-or of a group parity symbol of a particular data group against surviving data symbols of the particular data group to recover a failed data symbol of the particular data group.

4. The method of claim 1, wherein the recovering from failures comprises solving b+g equations, wherein the b+g equations comprise:
g equations with j=1, . . . , g, that comprise:
setting a first sum equal to $Z_j$, wherein the first sum comprises a sum from i=1 to r of $X_{i,j}$; and
b equations, with P=0, . . . , b−1, that comprise:
setting a first sum plus a second sum equal to zero, wherein:
the first sum comprises a sum from j=1 to g of:
a sum from i=1 to r of:
a product of $\omega^i$ and $\lambda_j$, raised to a power of $2^P$, and multiplied by $X_{i,j}$; and
the second sum comprises a sum from i=1 to b of:
a product of $\omega_i$ and $\lambda_{g+1}$, raised to a power of $2^P$, and multiplied by $Y_i$,
wherein $X_{i,j}$ is a data symbol, $Y_i$ is a global parity symbol, $Z_j$ is a group parity symbol, g is a number of the plurality of data groups, r is a number of data symbols per data group, b is the number of global parity symbols, $\{\lambda_1, \ldots, \lambda_{g+1}\}$ is a collection of elements such that any b of them are linearly independent in a particular field, and co is a primitive element of the particular field.

5. The method of claim 1, wherein generating the at least two global parity symbols comprises solving b equations with P=0, b−1, wherein the b equations comprise:

$$\Sigma_{j=1}^{g} \Sigma_{i=1}^{r} (\omega^i \lambda_j)^{2^P} X_{i,j} + \Sigma_{i=1}^{b} (\omega^i \lambda_{g+1})^{2^P} Y_i = 0,$$

wherein $X_{i,j}$ is a data symbol, $Y_i$ is a global parity symbol, g is a number of the plurality of data groups, r is a number of data symbols per data group, b is the number of global parity symbols, $\{\lambda_1, \ldots, \lambda_{g+1}\}$ is a collection of elements such that any b of them are linearly independent in a particular field, and $\omega$ is a primitive element of the particular field.

6. The method of claim 1, wherein a combination of a number of data symbols in the set of data symbols with a number of parity symbols in the group of parity symbols is greater than one more than a locality parameter.

7. A system, comprising:
one or more processors;
a memory that includes a plurality of computer-executable components, the plurality of computer-executable components comprising an encoder module to:
arrange a first plurality of machines into a grid of rows and columns;
arrange a set of data symbols into a plurality of data groups so that each data group in the plurality of data groups includes a subset of the set of data symbols;
for each data group in the plurality of data groups:
generate a group parity symbol based on the subset of the set of data symbols included in the data group; and
include the group parity symbol in the data group;
store each of the plurality of data groups in a column of the first plurality of machines;
generate, as part of a global parity group, a number of first global parity symbols that is equal to a number of the columns, wherein each of the first global parity symbols is generated based on all the data symbols in the set of data symbols;

generate a second global parity symbol, wherein the second global parity symbol is a parity of the first global parity symbols;
include the second global parity symbol in the global parity group;
store the global parity group across a second plurality of machines that is different than the first plurality of machines; and
wherein generating the first global parity symbols comprises solving r equations with P=0, . . . ,r−1, wherein the r equations comprise:
setting a first sum plus a second sum equal to zero, wherein:
the first sum comprises a sum from j=1 to g of:
a sum from i=1 to r of:
a product of $\omega_i$ and $\lambda_j$, raised to a power of $2^P$, and multiplied by $X_{i,j}$;
and
the second sum comprises a sum from i=1 to r of:
a product of $\omega_i$ and $\lambda_{g+1}$, raised to a power of $2^P$, and multiplied by $Y_i$,
wherein $X_{i,j}$ is a data symbol, $Y_i$ is a global parity symbol, g is a number of the rows, r is a number of the columns, $\{\lambda_1, \ldots, \lambda_{g+1}\}$ is a collection of elements such that any g of them are linearly independent in a particular field, and $\omega$ is a primitive element of the particular field.

8. The system of claim 7, wherein generating the group parity symbol comprises performing an exclusive-or of the subset of the set of data symbols included in the data group.

9. The system of claim 7, wherein generating the second global parity symbol comprises performing an exclusive-or of the first global parity symbols.

10. The system of claim 7, wherein:
the plurality of computer-executable components further comprises a recovery module to recover from failures;
the failures comprise no more than a failure of one data symbol in each of the plurality of data groups; and
recovering from the failures comprises performing a linear operation between a group parity symbol of a particular data group and surviving data symbols of the particular data group to recover a failed data symbol of the particular data group.

11. The system of claim 7, wherein:
the plurality of computer-executable components further comprises a recovery module to recover from failures;
the failures comprise no more than a failure of one data symbol in each of the plurality of data groups; and
recovering from the failures comprises performing an exclusive-or of a group parity symbol of a particular data group against surviving data symbols of the particular data group to recover a failed data symbol of the particular data group.

12. The system of claim 7, wherein:
the plurality of computer-executable components further comprises a recovery module to recover from failures;
the failures comprise a failure of one of the first global parity symbols; and
recovering from the failures further comprises performing an exclusive-or of the second global parity symbol against surviving first global parity symbols of the global parity group to recover a failed first global parity symbol of the global parity group.

13. The system of claim 7, wherein the plurality of computer-executable components further comprises a recovery module to recover from failures, the recovery module solves g+r+1 equations, wherein the g+r+1 equations comprise:

g equations with j=1, . . . , g, that comprise:
setting a first sum equal to $Z_j$, wherein the first sum comprises a sum from i=1 to r of $X_{i,j}$;
a (g+1)th equation that comprises:
setting a first sum equal to $Z_{g+1}$, wherein the first sum comprises a sum from i=1 to r of $Y_i$; and
r equations, with P=0, . . . , r−1, that comprise:
setting a first sum plus a second sum equal to zero, wherein:
the first sum comprises a sum from j=1 to g of:
a sum from i=1 to r of:
a product of $\omega^i$ and $\lambda_j$, raised to a power of $2^P$, and multiplied by $X_{i,j}$; and
the second sum comprises a sum from i=1 to r of:
a product of $\omega^i$ and $\lambda_{g+1}$, raised to a power of $2^P$, and multiplied by $Y_i$,
wherein $X_{i,j}$ is a data symbol, $Y_i$ is a global parity symbol, $Z_j$ is a group parity symbol, $Z_{g+1}$ is the second global parity symbol, g is a number of the rows, r is a number of the columns, $\{\lambda_1, \ldots, \lambda_{g+1}\}$ is a collection of elements such that any g of them are linearly independent in a particular field, and $\omega$ is a primitive element of the particular field.

14. The system of claim 7, wherein a combination of a number of data symbols in the set of data symbols with a number of parity symbols in the group of parity symbols is greater than one more than a locality parameter.

15. A system comprising:
one or more processors; and
memory storing computer-executable instructions that, when executed, cause the one or more processors to perform acts comprising:
arranging a set of data symbols into a plurality of data groups so that each data group in the plurality of data groups includes a subset of the set of data symbols;
for each data group in the plurality of data groups:
generating a group parity symbol based on the subset of the set of data symbols included in the data group; and
including the group parity symbol in the data group;
storing the plurality of data groups across a first set of machines;
generating at least two global parity symbols, wherein each of the at least two global parity symbols is generated based on all the data symbols in the set of data symbols;
including the at least two global parity symbols in a global parity group;
storing the global parity group across a second set of machines that is different than the first set of machines; and
recovering from failures, wherein the failures comprise:
up to a first failure associated with any one symbol included in each data group of the plurality of data groups;
up to a number of additional failures associated with additional symbols of the plurality of data groups and the at least two global parity symbols, wherein the number of additional failures is up to a number of the at least two global parity symbols and;
wherein generating the at least two global parity symbols comprises solving b equations with P=0, b−1, wherein the b equations comprise:
setting a first sum plus a second sum equal to zero, wherein:
the first sum comprises a sum from j=1 to g of:

a sum from i=1 to r of:
a product of $\omega^i$ and $\lambda_j$, raised to a power of $2^P$, and multiplied by $X_{i,j}$;
and
the second sum comprises a sum from i=1 to b of:
a product of $\omega^i$ and $\lambda_{g+1}$, raised to a power of $2^P$, and multiplied by $Y_i$,
wherein $X_{i,j}$ is a data symbol, $Y_i$ is a global parity symbol, g is a number of the plurality of data groups, r is a number of data symbols per data group, b is the number of global parity symbols, $\{\lambda_1, \ldots, \lambda_{g+1}\}$ is a collection of elements such that any b of them are linearly independent in a particular field, and $\omega$ is a primitive element of the particular field.

16. The system of claim 15, wherein for each data group in the plurality of data groups, the group parity symbol is based upon an exclusive-or of the subset of the set of data symbols included in the data group.

17. The system of claim 15, wherein the recovering from failures comprises solving b+g equations, wherein the b+g equations comprise:
g equations with j=1, . . . , g, that comprise:
setting a first sum equal to $Z_j$, wherein the first sum comprises a sum from i=1 to r of $X_{i,j}$; and
b equations, with P=0, b−1, that comprise:
setting a first sum plus a second sum equal to zero, wherein:
the first sum comprises a sum from j=1 to g of:
a sum from i=1 to r of:
a product of $\omega_i$ and $\lambda_j$, raised to a power of $2^P$, and multiplied by $X_{i,j}$; and
the second sum comprises a sum from i=1 to b of:
a product of $\omega^i$ and $\lambda_{g+1}$, raised to a power of $2^P$, and multiplied by $Y_i$,
wherein $X_{i,j}$ is a data symbol, $Y_i$ is a global parity symbol, $Z_j$ is a group parity symbol, g is a number of the plurality of data groups, r is a number of data symbols per data group, b is the number of global parity symbols, $\{\lambda_1, \ldots, \Delta_{g+1}\}$ is a collection of elements such that any b of them are linearly independent in a particular field, and $\omega$ is a primitive element of the particular field.

18. The system of claim 15, wherein generating the at least two global parity symbols comprises solving b equations with P=0, b−1, wherein the b equations comprise:

$$\Sigma_{j=1}^{g}\Sigma_{i=1}^{r}(\omega^i\lambda_j)^{2^P}X_{i,j}+\Sigma_{i=1}^{b}(\omega^i\lambda_{g+1})^{2^P}Y_i=0,$$

wherein $X_{i,j}$ is a data symbol, $Y_i$ is a global parity symbol, g is a number of the plurality of data groups, r is a number of data symbols per data group, b is the number of global parity symbols, $\{\lambda_1, \ldots, \lambda_{g+1}\}$ is a collection of elements such that any b of them are linearly independent in a particular field, and $\omega$ is a primitive element of the particular field.

19. The system of claim 15, wherein recovering from the failures comprises performing an exclusive-or of a group parity symbol of a particular data group against surviving data symbols of the particular data group to recover a failed data symbol of the particular data group.

20. The system of claim 15, wherein a combination of a number of data symbols in the set of data symbols with a number of parity symbols is greater than one more than a locality parameter.

* * * * *